US011072261B2

(12) United States Patent
Gomez et al.

(10) Patent No.: US 11,072,261 B2
(45) Date of Patent: Jul. 27, 2021

(54) TRAY TABLE DEVICE FOR A SEAT OF A VEHICLE AND VEHICLE SEAT

(71) Applicant: Adient Engineering and IP GmbH, Burscheid (DE)

(72) Inventors: John J. Gomez, Howell, MI (US); James D. Biebel, Milford, MI (US); Raza Bashir, Sterling Heights, MI (US); Fawaz Yono, West Bloomfield, MI (US); Kurt A. Seibold, Farmington Hills, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/734,761

(22) Filed: Jan. 6, 2020

(65) Prior Publication Data
US 2020/0215950 A1    Jul. 9, 2020

Related U.S. Application Data

(60) Provisional application No. 62/788,996, filed on Jan. 7, 2019.

(51) Int. Cl.
| *B60N 2/20* | (2006.01) |
| *B60N 2/10* | (2006.01) |
| *B60N 2/005* | (2006.01) |
| *B60N 2/60* | (2006.01) |
| *B60N 3/00* | (2006.01) |
| *B60N 2/75* | (2018.01) |
| *B60N 2/01* | (2006.01) |
| *B60N 2/16* | (2006.01) |
| *B60R 7/04* | (2006.01) |
| *B60R 22/20* | (2006.01) |
| *B60R 22/26* | (2006.01) |
| *B60N 2/56* | (2006.01) |
| *G05D 1/02* | (2020.01) |

(52) U.S. Cl.
CPC ............ *B60N 2/20* (2013.01); *B60N 2/005* (2013.01); *B60N 2/012* (2013.01); *B60N 2/10* (2013.01); *B60N 2/16* (2013.01); *B60N 2/5621* (2013.01); *B60N 2/6027* (2013.01); *B60N 2/753* (2018.02); *B60N 2/79* (2018.02); *B60N 3/004* (2013.01); *B60R 7/043* (2013.01); *B60R 22/20* (2013.01); *B60R 22/26* (2013.01); *B60N 2/797* (2018.02); *B60N 3/002* (2013.01); *G05D 1/021* (2013.01)

(58) Field of Classification Search
CPC . B60N 2/753; B60N 2/79; B60N 2/75; B60N 2/797; B60N 2/763; B60N 2/767; B60N 3/004; B60N 3/002; B60N 3/001; A47C 7/68; A47C 7/70
USPC .......................................... 297/146, 135, 145
See application file for complete search history.

(56) References Cited

U.S. PATENT DOCUMENTS

| 6,598,934 B1* | 7/2003 | Anderson ................ B60N 2/79 297/162 |
| 2010/0243839 A1* | 9/2010 | Westerink ........ B64D 11/00153 248/276.1 |

(Continued)

*Primary Examiner* — Mark R Wendell
(74) *Attorney, Agent, or Firm* — Marshall & Melhorn, LLC

(57) ABSTRACT

The present disclosure refers to a tray table device for a vehicle seat that may have at least a table element and a table support structure connected to the table element. Further, the present disclosure refers to a vehicle seat that may have such a tray table device.

13 Claims, 13 Drawing Sheets

(56) References Cited

U.S. PATENT DOCUMENTS

| | | | | |
|---|---|---|---|---|
| 2012/0167807 A1* | 7/2012 | Legeay | ............... | B60N 3/002 |
| | | | | 108/41 |
| 2013/0076082 A1* | 3/2013 | Herault | ............. | B64D 11/0638 |
| | | | | 297/173 |
| 2014/0300148 A1* | 10/2014 | Frost | .................. | B60N 2/242 |
| | | | | 297/173 |
| 2015/0321592 A1* | 11/2015 | De Morais | ............ | A47B 5/006 |
| | | | | 297/147 |
| 2016/0167555 A1* | 6/2016 | Allen | ............... | B64D 11/0638 |
| | | | | 108/40 |
| 2018/0339775 A1* | 11/2018 | Reyes | ................ | B60N 3/002 |
| 2019/0308538 A1* | 10/2019 | Buchanan | ............... | A47B 1/10 |

* cited by examiner

TRAY TABLE DEVICE FOR A SEAT OF A VEHICLE AND VEHICLE SEAT

BACKGROUND OF THE DISCLOSURE

The present disclosure relates generally to a tray table device for a vehicle seat and a vehicle seat comprising such a tray table device.

In the state of the art, tray table devices for vehicle seats are known. For example, tray tables are stored in a center console and deployable from the center console between front row seats. Further, tray tables are known to be arranged on a rear side of a backrest for a passenger seated behind.

SUMMARY OF THE DISCLOSURE

It is an object of the present disclosure to provide an improved tray table device for a vehicle seat. For instance, the present disclosure relates to an improved tray table device for a seat of an autonomous driving vehicle. Further it is an object of the present disclosure to provide an improved vehicle seat.

According to the disclosure, the object of the tray table device is solved by the features claimed in claim 1. Further according to the disclosure, the object of the vehicle seat is solved by the features claimed in claim 14.

According to the disclosure, a tray table device for a vehicle seat provided within a vehicle comprises a table element and a table support structure connected to the table element. The table support structure comprises a carrier structure and a table support linkage, wherein the carrier structure and the table support linkage are connected to each other via a single pivot connection. The table element, in particular a tray table element, is continuously movable about the single pivot connection between a vertical stowed position and a horizontal use position.

Advantages of the present disclosure are providing a substantially lightweight and simple design of the tray table device for a vehicle seat. The single pivot connection allows a quick and simple stowing and deploying motion of the table element. Further, the present invention offers a specific, novel and unique design of the tray table device. For instance, the tray table device may be provided to a vehicle seat of an autonomous driving vehicle. Moreover, in a manual handling of the tray table device, the table element may be moved easily by an occupant between the vertical stowed position and the horizontal use position while a comparatively high effort is not required. In a powered embodiment of the tray table device, only one drive unit or any other actuator mechanism is required to drive the table element between the vertical stowed position and the horizontal use position which allows a simple and lightweight design.

The tray table device is mounted to the vehicle seat, for instance, at one side of the vehicle seat. In particular, in the stowed position of the tray table, also designated as table element, the tray table is positioned vertically at the side of the seat.

According to an embodiment, the table support structure is arranged in an area of a backrest of the vehicle seat.

According to an embodiment, the table support structure is arranged in an area of a seat pan of the vehicle seat.

According to an embodiment, the table support structure is mounted to a lateral side of the backrest and/or the seat pan. For example, the table support structure is mounted to an armrest structure of the vehicle seat or any other structural component adjacent the vehicle seat, particularly arranged on the lateral side of the backrest. In particular, the carrier structure is mounted to any part or surrounding component of the vehicle seat. The carrier structure is a stationary part. The table support linkage is a movable part which is rotatable relative to the carrier structure.

In the vertical stowed position of the table element, at least the table element is arranged next to a lateral side of the backrest and/or the seat pan. In the horizontal use position, at least the table element is arranged above the seat pan, wherein the table element is positioned substantially parallel to a horizontal axis of the seat pan.

According to a further embodiment, the table element is coupled to one end of the table support linkage and the other end of the table support linkage is coupled to the carrier structure. For instance, the ends of the table support linkage are substantially circular shaped.

According to an embodiment, the table element is moved together with the table support linkage about the single pivot connection between the vertical stowed position and the horizontal use position. The movement of the table element and the table support linkage is a simple sweeping movement or motion.

According to an embodiment, the table element and the table support linkage may be configured as one-piece or separate parts. Nevertheless, it is understood that moving of the table support linkage leads to moving of the table element relative to the carrier structure, in particular relative to the vehicle seat.

According to a further embodiment, the table support structure provides a tilted pivot axis. For example, the table support structure provides a pivot axis positioned tilted relative to a vertical axis at an angle of about 20° to 60°, for example 30° to 50°, in particular 45°. The vertical axis refers to a parallel axis with respect to a vertical axis of the vehicle. In particular, the tilted pivot axis is provided through the carrier structure.

According to a further embodiment, the carrier structure comprises a mounting area and a table connection area. The table connection area is coupled to the one end of the table support linkage. In particular, the table connection area provides the tilted pivot axis. For example, the table connection area is positioned tilted at an angle of about 20° to 60°, for example 30° to 50°, in particular 45° relative to the vertical axis. In a manufacturing step or in an assembly step of the tray table device, a tilt angle of the table support structure may be adjusted as required, for example depending on a requested alignment or height or storage space of the table element.

According to an embodiment, the table support linkage is moved about the tilted pivot axis in a substantially arc-shaped or arched manner between the vertical stowed position and the horizontal use position. Thereby, the table element is movable in an arc-shaped or arched manner about the pivot connection. In particular, a simple sweeping movement or motion may be carried out. Such a positioning movement or motion of the table element is particularly visually appealing. Moreover, the tray table is translated from the vertical stowed position to the horizontal use position in one single movement.

According to another embodiment, the pivot axis defines an arc-shaped or arched movement path followed by the table support linkage so that, starting from the vertical stowed position, the table element is rotated from a substantially lateral vertical position relative to a seat pan about a front side of a seat pan to the horizontal use position substantially parallel above the seat pan.

In another embodiment, wherein in the horizontal use position an upper usage surface of the table element substantially faces in a direction towards a ceiling of a vehicle, and in the vertical stowed position the upper usage surface substantially faces in a direction away from a lateral seat side of the vehicle seat.

According to a further embodiment, the table element is moved manually or automatically between the vertical stowed position and the horizontal use position. In particular, the movement of the tray table can be powered or manually carried out. For example, for a manual handling of the tray table device, the table support structure comprises a simple release and latch mechanism which may be actuated by an occupant. For instance, the table support structure is latched in the vertical stowed position and in the horizontal use position. For example, a position lock mechanism is arranged in a connection area of the carrier structure and the table support linkage. The position lock mechanism may comprise a number of detents for different lock positions of the table element, in particular of the table support linkage arm, at least partially along a movement path of the table element, in particular about a predefined pivot axis. The occupant may actuate a release mechanism via a button. The button may be arranged in the vehicle, next to the vehicle seat such as on the armrest structure, on the table element or the table support structure. Afterwards the occupant may manually push or pull the table element from the horizontal use position to the vertical stowed position or vice versa. Due to the arc-shaped or curved sweeping motion provided by the table support structure, stowing or deploying the table element is self-descriptive.

According to an embodiment, the table support structure comprises a drive unit for powered adjustment of the table element between the vertical stowed position and the horizontal use position. For example, the drive unit is arranged within the carrier structure. The drive unit is coupled to the table support linkage in a connection area of the carrier structure and the table support linkage. For example, the table support structure comprises or is configured as a pivot fitting. For instance, a recliner mechanism is arranged in the connection area of the carrier structure and the table support linkage. For example, actuation of the drive unit may be initiated manually or electrically. For instance, the table support structure is latched in the vertical stowed position and in the horizontal use position. The occupant may actuate the drive unit via a button or a touch display. Afterwards the drive unit automatically drives the table element from the horizontal use position to the vertical stowed position or vice versa. Due to operating or non-operating the drive unit, the table element, in particular the table support linkage, may be positioned in any position along the movement path of the table element, in particular about a predefined pivot axis.

According to a further embodiment, the table element is pivotable coupled to the table support linkage, wherein the table element is pivotable between at least two horizontal positions. Thereby, an occupant may adjust the horizontal use position as required. Further, an egress and ingress may be provided to the occupant even when the table element is positioned in the horizontal use position without the need of fully stowing the table element for egress and ingress. For instance, the table element is pivotable about a vertical axis provided through a pivot arranged on or in the table support linkage.

In another embodiment, the table support linkage comprises at least a clock spring mechanism. For example, the clock spring mechanism is integrated in the end of the table support linkage which is coupled to the table element. Further, a clock spring like pivot may be provided by the table support linkage. The table support linkage may be formed as an extension arm of the table element. The clock spring like pivot is configured to allow the table element to swing away if required and returning back to its original position. For example, the table element can be easily rotated out of the way for a seated occupant in emergency situations, so the occupant can easily exit the seat.

According to another embodiment, the table element is pivotable coupled to the table support linkage such that the table element is pivotable about a horizontal axis. Optionally or additionally, the table support linkage is divided such that the end coupled to table element is rotatable relative to the end coupled to the carrier structure. For example, the table element comprises a display for entertainment or controlling seat features, wherein the table element can be positioned in a tipped position at least towards the occupant due to pivoting the table element about the horizontal pivot axis and/or due to pivoting of the table element end of the table support linkage relative to the carrier structure end.

Further according to the disclosure, a vehicle seat comprises at least a seat pan, a backrest coupled to the seat pan and a tray table device as described above. For example, the table support structure is arranged next to the backrest and/or the seat pan, wherein the table element is arranged substantially laterally next to the backrest and/or the seat pan when the table element is positioned in the vertical stowed position.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1:
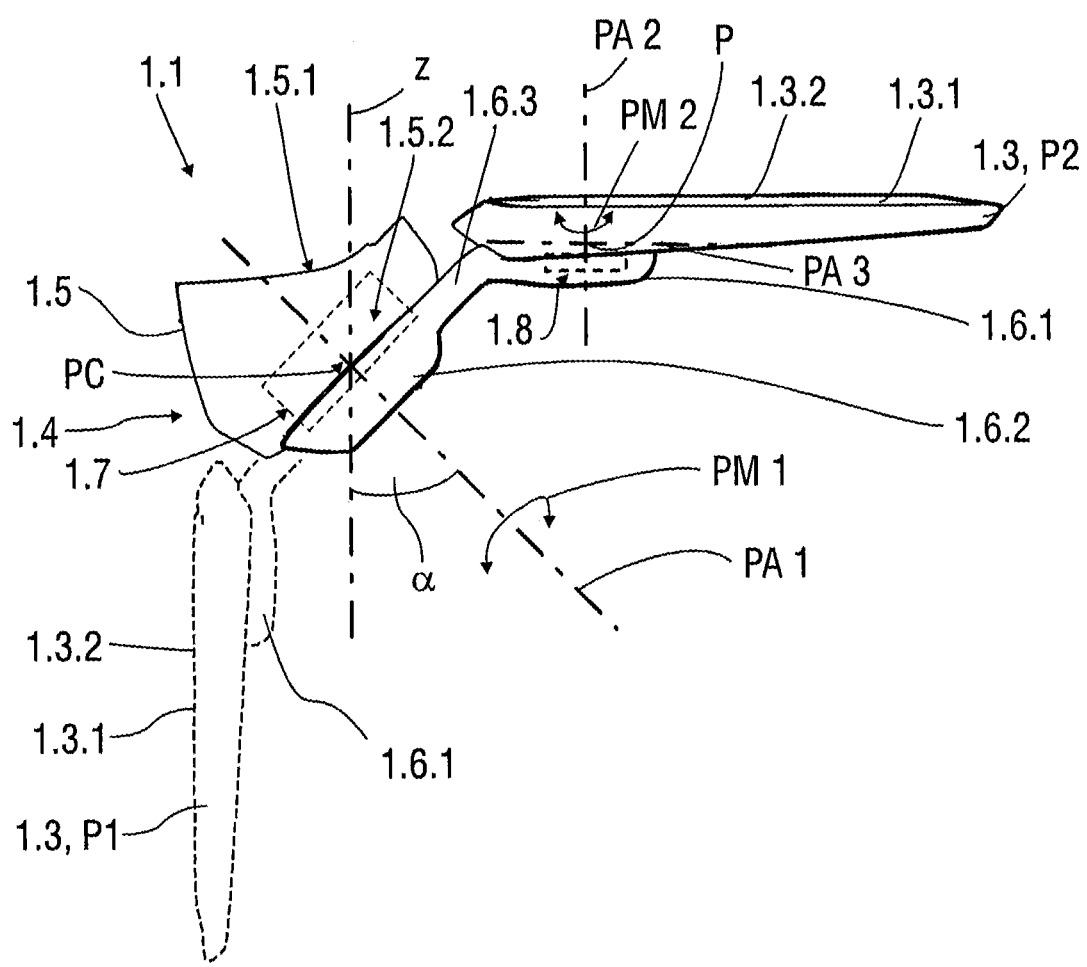
FIG. 1 shows a front view of an embodiment of a tray table device.

FIG. 1 shows a front view of an embodiment of a tray table device 1.1 for a vehicle seat 1.2.

The tray table device 1.1 comprises a tray table element 1.3 and a table support structure 1.4 connected to the tray table element 1.3. The table support structure 1.4 comprises a carrier structure 1.5 and a table support linkage 1.6, wherein the carrier structure 1.5 and the table support linkage 1.6 are connected to each other via a single pivot connection PC. The tray table 1.3 is continuously movable about the single pivot connection PC between a vertical stowed position P1 and at least one horizontal use position P2. The table support structure 1.4 is tilted at a 45° axis relative to a vertical axis z. In particular, the single pivot connection PC is configured as a pivot mechanism. The single pivot connection PC is tilted with respect to the vertical axis z. The single pivot connection PC provides a pivot axis PA1 about which the table element 1.3 is rotatable. The pivot axis PA1 is angled at an angle α of about 45° with respect to the vertical axis z. According to a further embodiment, the table support structure 1.4 provides a tilted pivot axis PA1. For example, the table support structure 1.4 provides a pivot axis PA1 positioned tilted relative to a vertical axis z at an angle α of about 20° to 60°, for example 30° to 50°, in particular 45°. The vertical axis z refers to a parallel axis with respect to a vertical axis z of the vehicle 2. In particular, the tilted pivot axis PA1 is provided through the carrier structure 1.5.

For a better understanding of subsequent descriptions a coordinate system is shown in the figures. The coordinate system comprises a longitudinal axis x, a transverse axis y and a vertical axis z in relation to the vehicle 2. In particular, the longitudinal axis x defines a longitudinal extending direction and length of the vehicle 2, the transverse axis y defines a transverse extension direction and width of the vehicle 2 and the vertical axis z defines a vertical extension direction and height of the vehicle 2.

The table element 1.3 is coupled to one end 1.6.1 of the table support linkage 1.6. The other end 1.6.2 of the table support linkage 1.6 is coupled to the carrier structure 1.5. The table support linkage 1.6 comprises a connecting arm 1.6.3 which couples both ends 1.6.1 and 1.6.2. The ends 1.6.1 and 1.6.2 are shaped bulbous to house pivot mechanism components. The end 1.6.1 is disc or a plate shaped and mounted to the table element 1.3. The table element 1.3 may be pivotable mounted on the end 1.6.1. The end 1.6.2 is disc or plate shaped and rotatable mounted to the carrier structure 1.5. In particular, both ends 1.6.1, 1.6.2 are substantially circular shaped. The carrier structure 1.5 may be mounted to an armrest structure 1.2.9, for instance shown in FIG. 2 or such as the occupant support component 1.2.1 or to a backrest structure or the like. The carrier structure 1.5 comprises a mounting area 1.5.1 and a table connection area 1.5.2. The table connection area 1.5.2 is coupled to the one end 1.6.2 of the table support linkage 1.6. In particular, the table connection area 1.5.2 provides the tilted pivot axis PA1. For example, the table connection area 1.5.2 is positioned tilted at an angle α of about 20° to 60°, for example 30° to 50°, in particular 45° relative to the vertical axis z. The table connection area 1.5.2 comprises a circular recess for movable mounting the circular shaped end 1.6.2 of the table support linkage 1.6.

The carrier structure 1.5 is a stationary structure. The table support linkage 1.6 is a movable structure mounted to the stationary structure. In particular, the table support linkage 1.6 is rotatable relative to the carrier structure 1.5. The table element 1.3 and the table support linkage 1.6 may be configured as one-piece or separate parts. Nevertheless, it is understood that moving of the table support linkage 1.6 leads to moving of the table element 1.3 relative to the carrier structure 1.5. The table support linkage 1.6 may be formed as an extension arm of the table element 1.3. For example, the table element 1.3 is moved together with the table support linkage 1.6 about the single pivot connection PC between the vertical stowed position P1 and the horizontal use position P2. The movement of the table support linkage 1.6 is a simple sweeping movement or motion. In particular, the single pivot connection PC allows a substantially arc-shaped or curved pivot motion PM1 or movement path about the tilted pivot axis PA1.

For example, the table support linkage 1.6 and so as the table element 1.3 are moved about the tilted pivot axis PA1 in a substantially arc-shaped or arched manner between the vertical stowed position P1 and the horizontal use position P2. The sweeping movement or motion follows an arc-shaped or arched movement path away from an occupant when the table element 1.3 is stowed and substantially towards the occupant when the table element 1.3 is deployed.

The table element 1.3 is moved manually or automatically between the vertical stowed position P1 and the horizontal use position P2. In particular, the movement of the tray table 1.3 can be powered or manually carried out.

According to the shown embodiment, the table support structure 1.4 comprises a drive unit 1.7 for powered adjustment of the table element 1.3, in particular of the table support linkage 1.6. For example, the drive unit 1.7 is arranged within the carrier structure 1.5. The drive unit 1.7 is coupled to the table support linkage 1.6 in the table connection area 1.5.2. For instance, the drive unit 1.7 comprises a drivable spine or the like coupled to a corresponding drivable part fixedly mounted on the end 1.6.2 of the table support linkage 1.6. Due to operating or non-operating the drive unit 1.7, the table element 1.3, in particular the table support linkage 1.6, may be positioned in any position along the movement path of the table element 1.3, in particular about the predefined pivot axis PA1. The occupant may actuate the drive unit 1.7 via a button or a touch display. The button or the like or the touch display may be arranged in an armrest area or any other area next to the seat 1.2. After actuation the drive unit 1.7 automatically drives the table element 1.3 from the horizontal use position P2 to the vertical stowed position P1 or vice versa.

Figure 9:
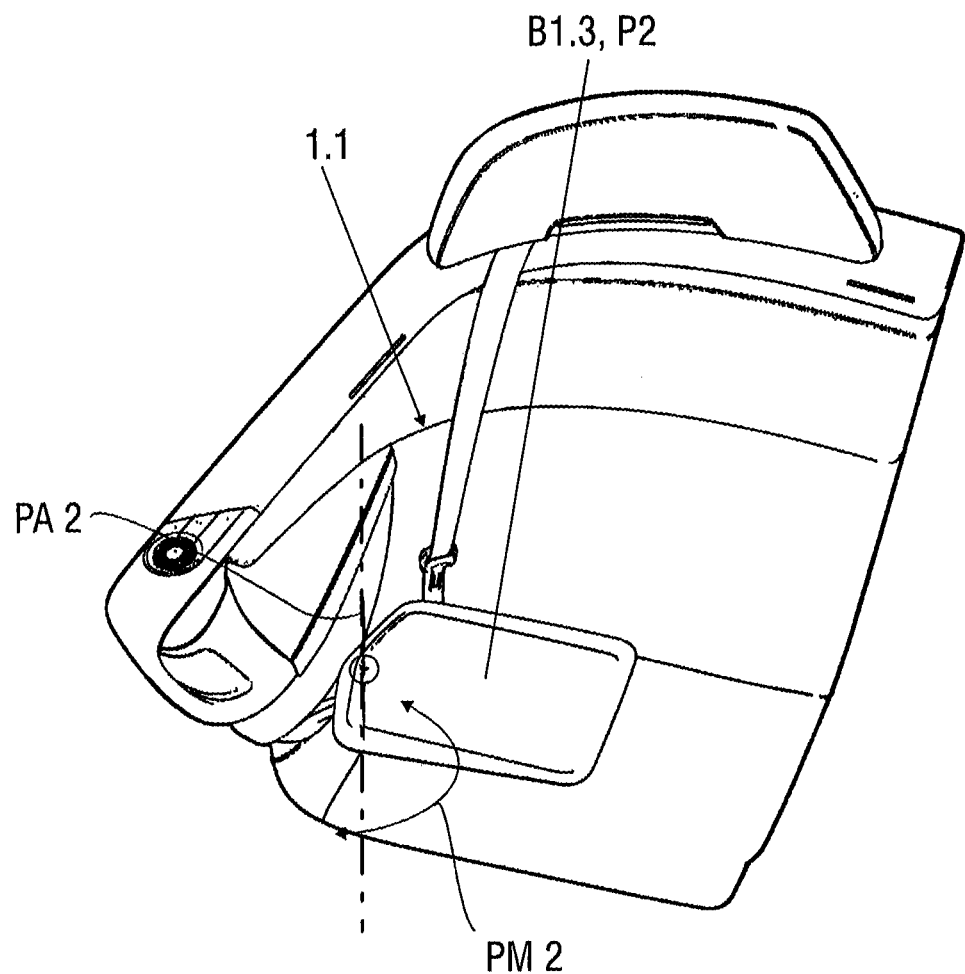
FIG. 9 shows a perspective view of an embodiment of a tray table device.
Figure 10:
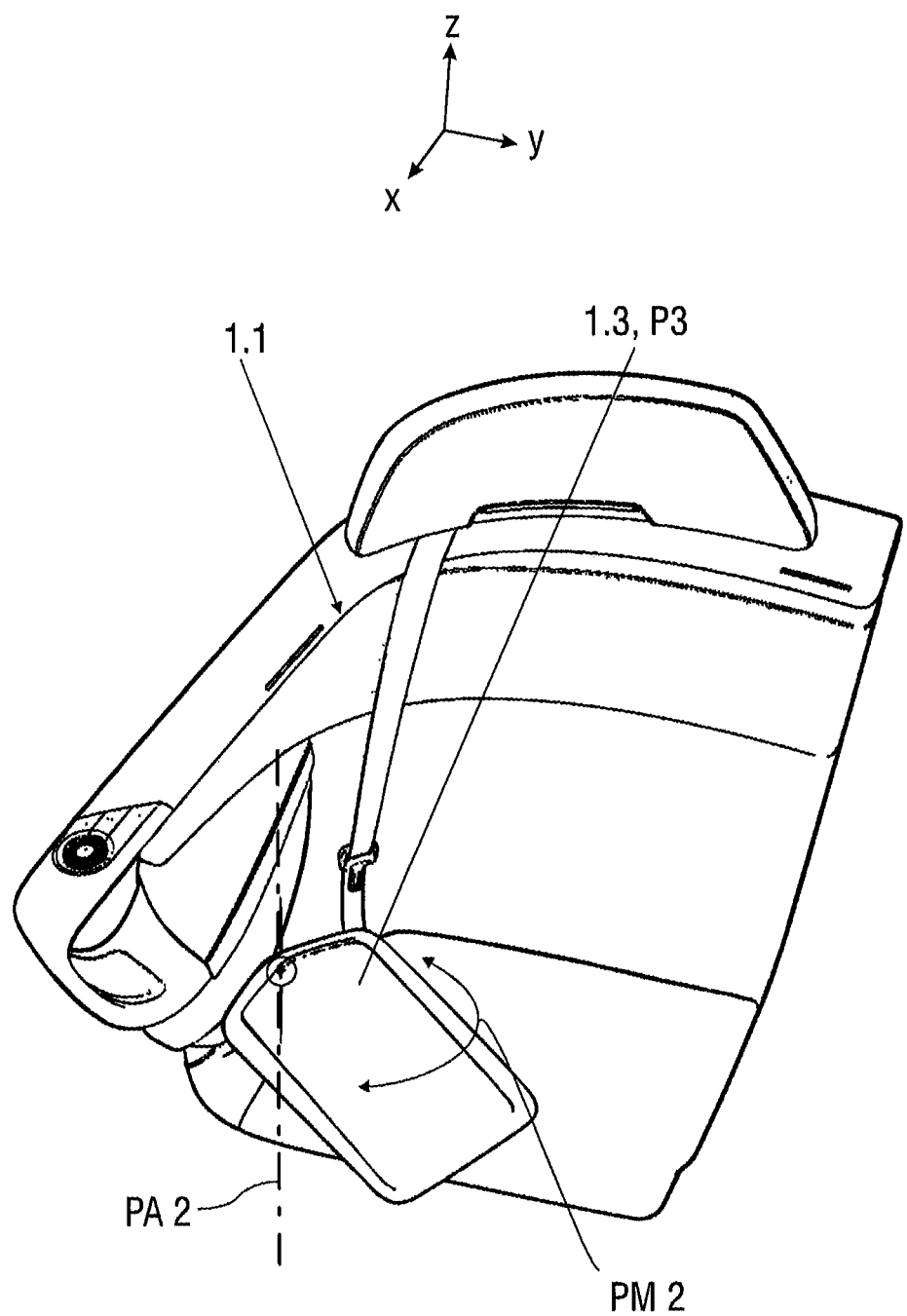
FIG. 10 shows a perspective view of an embodiment of a tray table device.

Moreover, the table element 1.3 is pivotable coupled to the table support linkage 1.6, wherein the table element 1.3 is pivotable between at least two horizontal use positions P2, P3 as shown in FIGS. 9 and 10. Thereby, an occupant may adjust the horizontal use position P2, P3 as required. Further, an egress and ingress may be provided to the occupant even when the table element 1.3 is not fully stowed. For instance, the table element 1.3 is pivotable about a vertical pivot axis PA2 provided through a pivot P arranged on or in the table support linkage 1.6. Therefore, the occupant may move the table element 1.3 from the horizontal use position P2 to the use position P3 or vice versa. For example, the pivot P is provided by a simple pivot mechanism or bearing mechanism. The pivot P allows a pivot motion PM2 of the table element 1.3 relative to the end 1.6.1 of the table support linkage 1.6 on a horizontal plane.

For example, the table support linkage 1.6 comprises at least a clock spring mechanism 1.8. For example, the clock spring mechanism 1.8 is integrated in the end 1.6.1 of the table support linkage 1.6 which is coupled to the table element 1.3. The clock spring mechanism 1.8 and the pivot P are configured to allow the table element 1.3 to swing away if required and returning back to its original position. For example, the table element 1.3 can be easily rotated out of the way for a seated occupant in emergency situations, so the occupant can easily exit the seat 1.2. For example, the end 1.6.1 is configured to house pivot mechanism components, such as the clock spring mechanism 1.8, providing the pivot P for the table element 1.3. An occupant or passenger may push or pull the table element 1.3 about the pivot axis PA2 provided through the pivot P. For instance, the clock spring mechanism 1.8 and pivot P may be actuated by a motor in emergency cases.

Furthermore, the table element 1.3 may be pivotable coupled to the table support linkage 1.6 such that the table element 1.3 is pivotable about a horizontal pivot axis PA3. Optionally or additionally, the table support linkage 1.6 may be divided such that the end 1.6.1 coupled to table element 1.3 is rotatable relative to the end 1.6.2 coupled to the carrier structure 1.5. For example, the table element comprises a display 1.3.1 for entertainment or controlling seat features, wherein the table element 1.3 can be positioned tipped or inclined at least towards the occupant by pivoting the table element 1.3 about the horizontal pivot axis PA3. For example, the table element 1.3 comprises an integrated display 1.3.1 arranged on an upper usage surface 1.3.2 of the table element 1.3. Optionally or additionally, the table element 1.3 can be positioned tipped or inclined at least towards the occupant by pivoting the end 1.6.1 mounted to the table element 1.3 relative to the end 1.6.2 mounted to the carrier structure 1.5.

Figure 2:
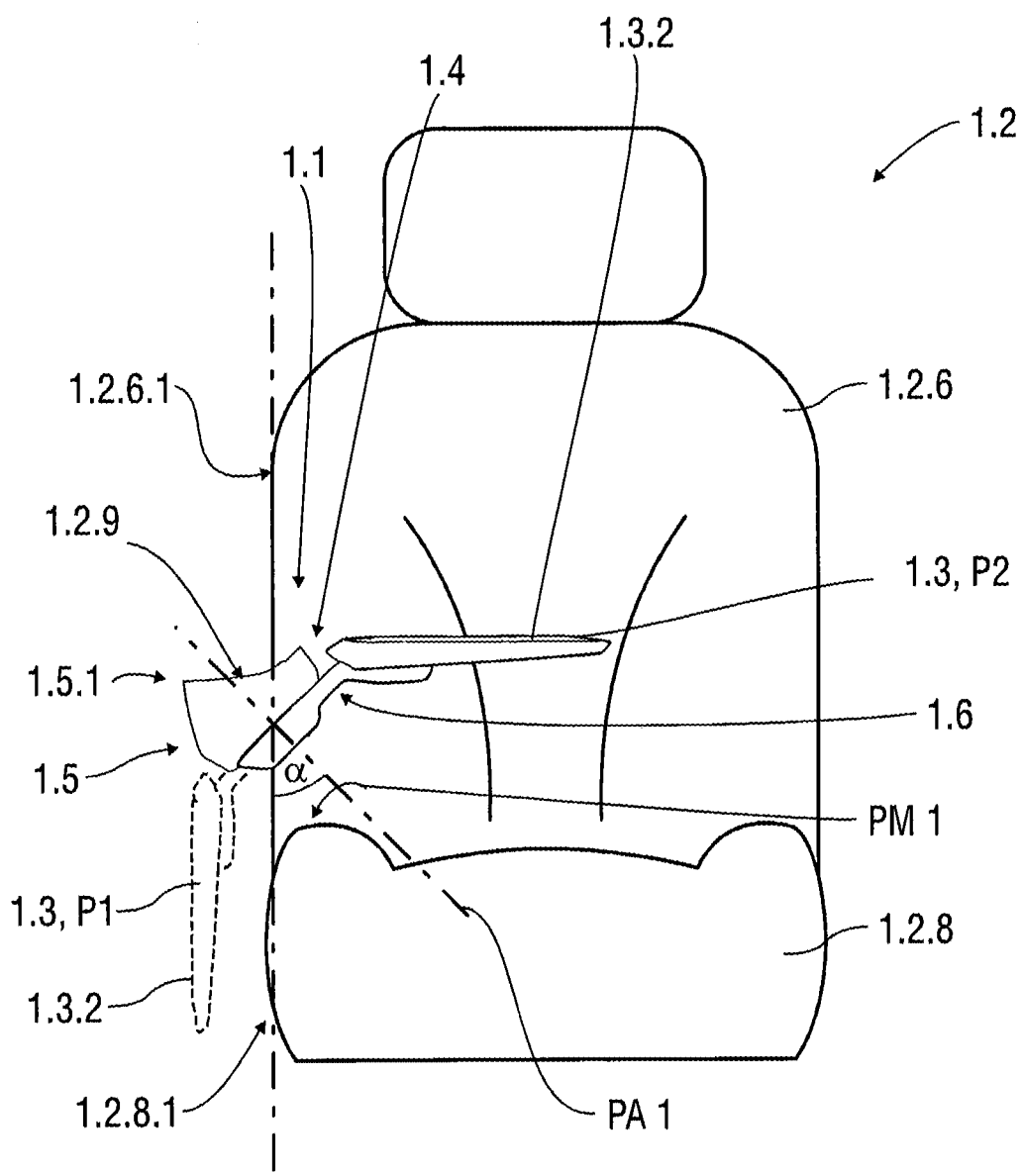
FIG. 2 shows a front view of an embodiment of a vehicle seat comprising a tray table device.

FIG. 2 shows a front view of an embodiment of a vehicle seat 1.2 comprising at least a seat pan 1.2.8, a backrest 1.2.6 and a tray table device 1.1.

The tray table device 1.1 is mounted to the vehicle seat 1.2, for instance, at one side of the vehicle seat 1.2. In particular, in the vertical stowed position P1 of the table element 1.3, the table element 1.3 is positioned vertically at the side of the seat 1.2. The table support structure 1.4 is arranged in an area of the backrest 1.2.6. The table support structure 1.4 is mounted to a lateral side 1.2.6.1 of the backrest 1.2.6. As exemplary shown, the table support structure 1.4 is mounted to an armrest structure 1.2.9 arranged adjacent the backrest 1.2.6.

In the vertical stowed position P1 of the table element 1.3 and so as the table support linkage 1.6, the table element 1.3 and the table support linkage 1.6 are arranged next to the lateral side 1.2.6.1 of the backrest 1.2.6. In particular, the end 1.6.1 of the table support linkage 1.6 and the connecting arm 1.6.3 are arranged adjacent the lateral side 1.2.6.1. In the shown embodiment, the table element 1.3 and the table support linkage 1.6 are stowed on a lateral side 1.2.8.1 of the seat pan 1.2.8. In the horizontal use position P2, P3, the table element 1.3 and the table support linkage 1.6 are arranged above the seat pan 1.2.8, wherein the table element 1.3 is positioned substantially parallel to the seat pan 1.2.8. In particular, the end 1.6.1 of the table support linkage 1.6 and the connecting arm 1.6.3 are arranged above the seat pan 1.2.8. For example, the table support linkage 1.6 is substantially L-shaped.

Figure 3:
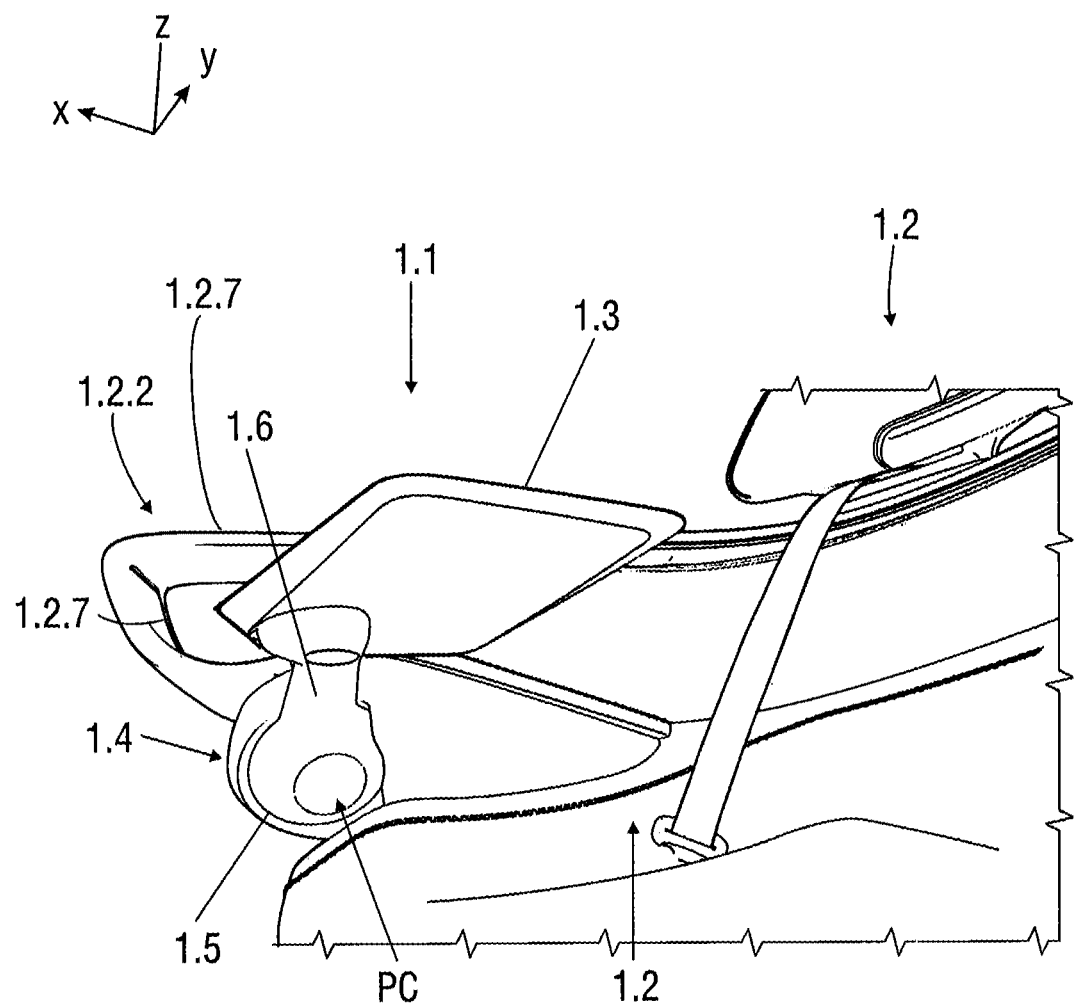
FIG. 3 shows a perspective view of an embodiment of a tray table device for a vehicle seat.
Figure 4:
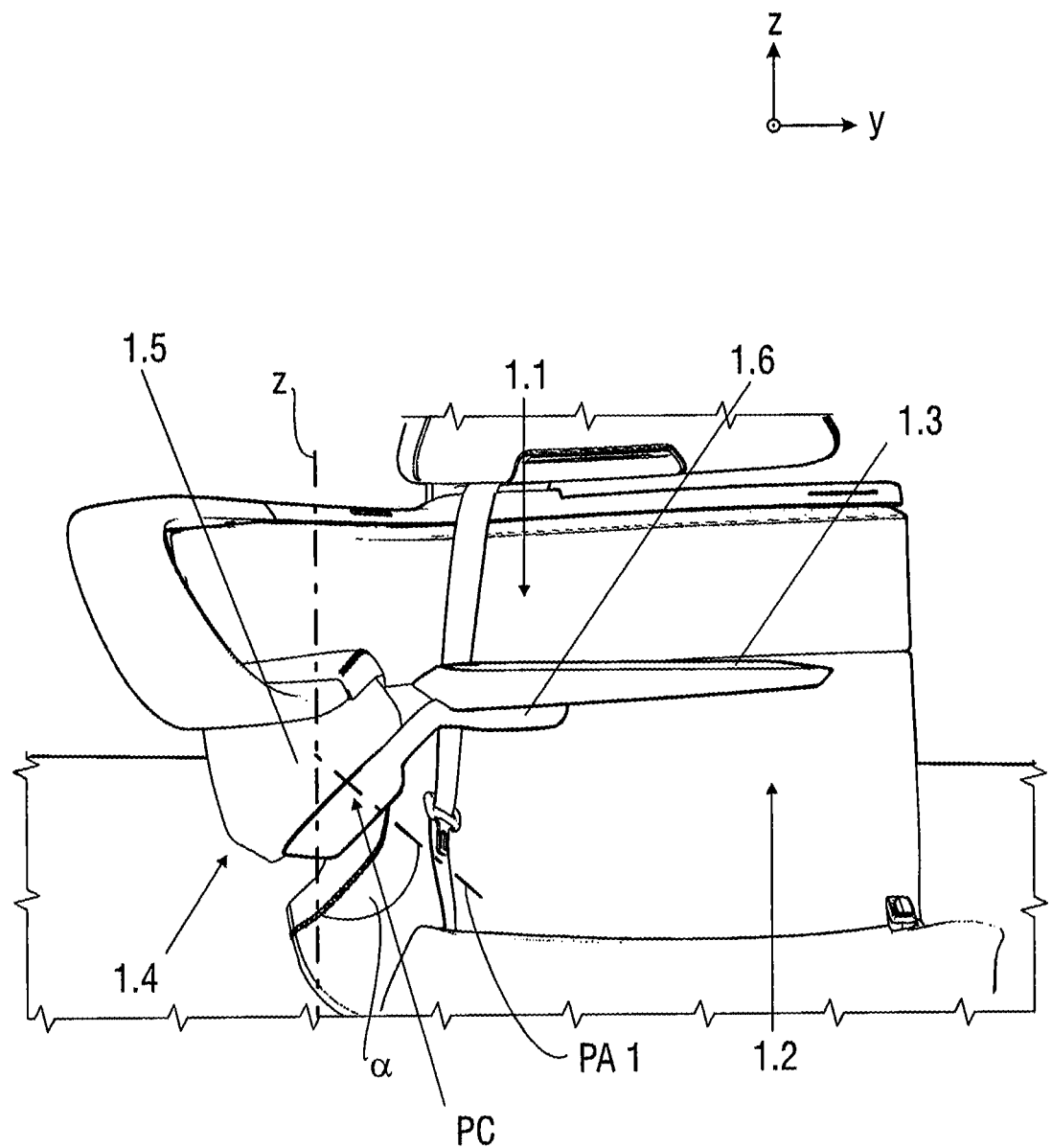
FIG. 4 shows a front view of an embodiment of a tray table device for a vehicle seat.

FIG. 3 shows a perspective view and FIG. 4 shows a front view of the tray table device 1.1 arranged on one side of the vehicle seat 1.2.

Figure 5:
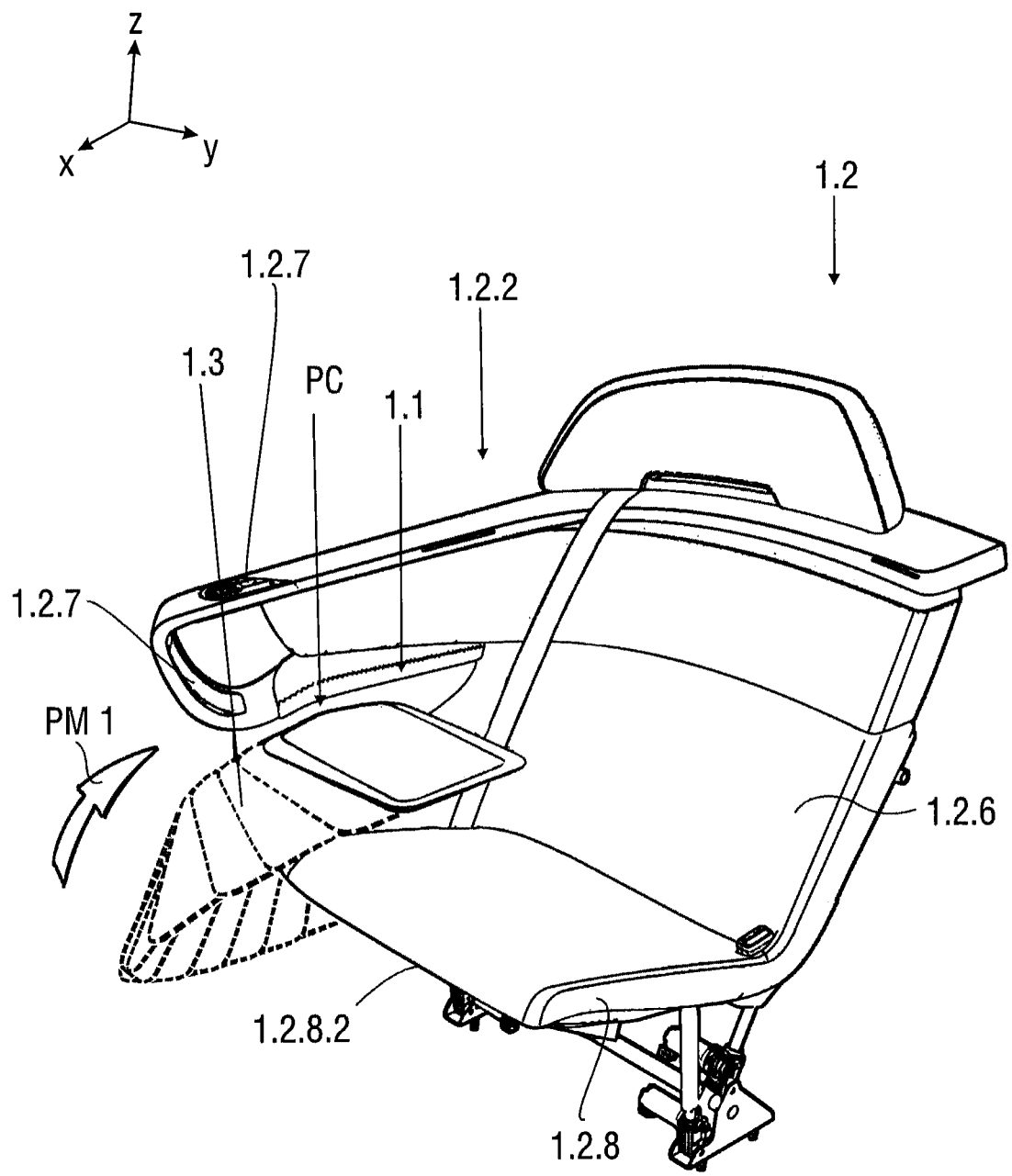
FIG. 5 shows a perspective view of a movement of a tray table element of a tray table device.

FIG. 5 shows a continuous movement of the tray table element 1.3. The tray table element 1.3 is movable in an arc-shaped or arched manner about the pivot axis PA1 (shown in FIG. 1) by the pivot connection PC.

Moreover, the tray table element 1.3 is translated from the vertical stowed position P1 to the horizontal use position P2 in one single movement. The movement of the tray table element 1.3 can be powered or manually carried out. The tray table element 1.3 provides a work surface for eating and working for the occupant while in travel. The movement of the tray table element 1.3 is a simple sweeping movement or motion. The tray table device 1.1 is mounted to the vehicle seat 1.2, for instance, at one side of the vehicle seat 1.2. In particular, in the stowed position P1 of the tray table element 1.3, the tray table element 1.3 is positioned substantially vertically adjacent the seat 1.2. That means that the table element 1.3 is substantially arranged on a vertical plane next to the vehicle seat 1.2.

Figure 6:
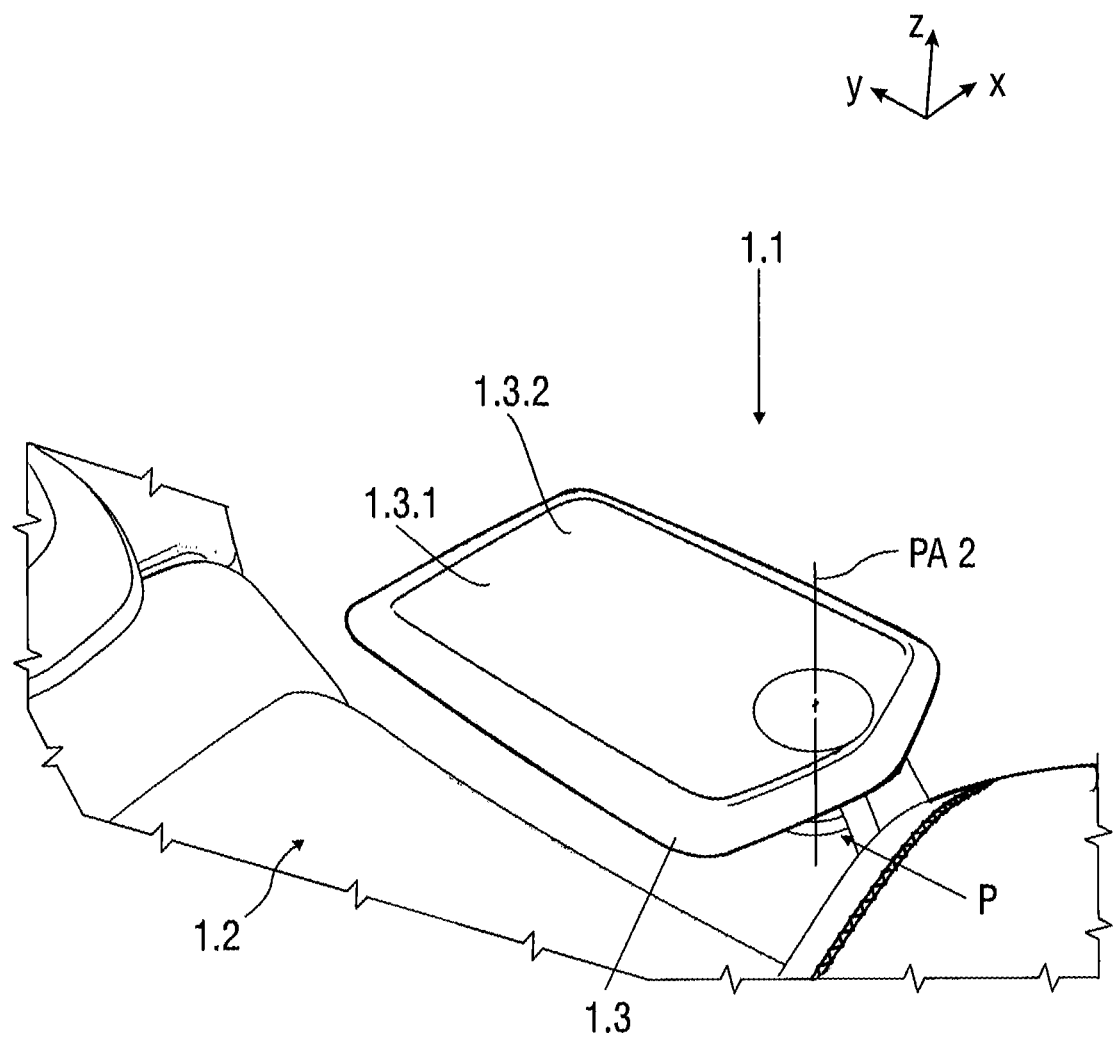
FIG. 6 shows a perspective view of an embodiment of a tray table element of a tray table device.

FIG. 6 shows a perspective view of an embodiment of a tray table element 1.3 of the tray table device 1.1.

Figure 7:
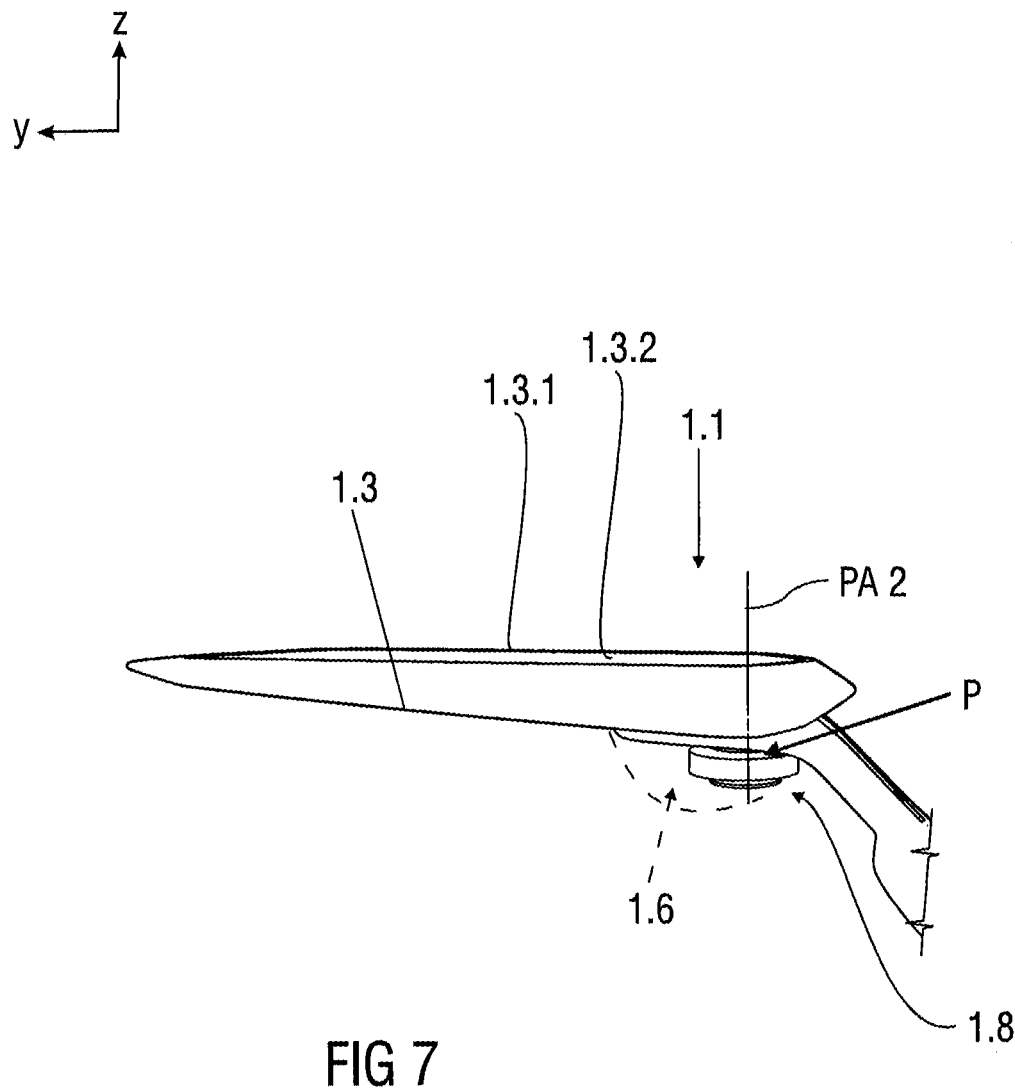
FIG. 7 shows a sectional view of an embodiment of a tray table element of a tray table device.

FIG. 7 shows a sectional view of an embodiment of the tray table element 1.3 of a tray table device 1.1 comprising a clock spring mechanism 1.8.

Figure 8:
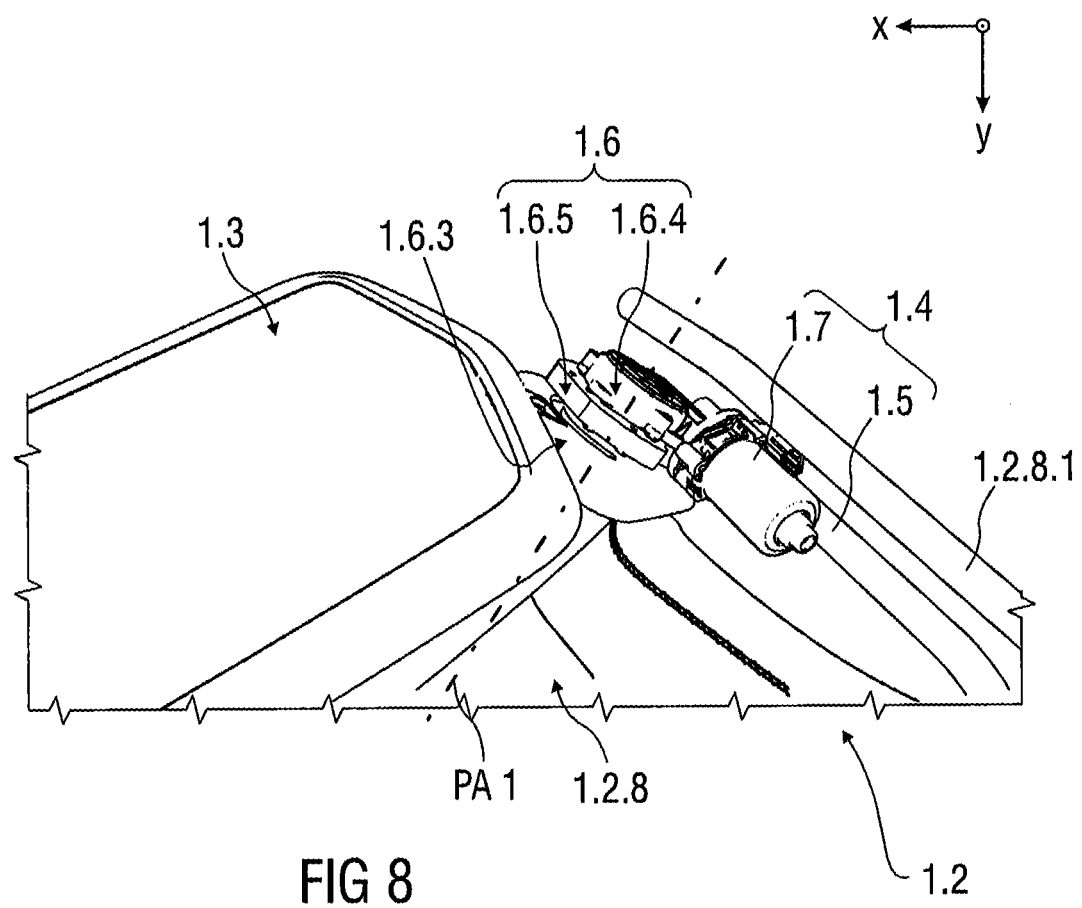
FIG. 8 shows a sectional top view of an embodiment of an uncovered table support structure of the tray table device comprising a drive unit.

FIG. 8 shows a sectional top view of an embodiment of an uncovered table support structure 1.4 of the tray table device 1.1 comprising a drive unit 1.7 for powered adjustment of the table support linkage 1.6 about the pivot axis PA1. The table support linkage 1.6 operatively connects the table element 1.3 and the table support structure 1.4 allowing the table element 1.3 to move about the pivot axis PA1 by the single pivot connection PC.

The table support linkage 1.6 comprises a first linkage member 1.6.4 located at or toward the carrier structure 1.5. The first linkage member 1.6.4 is e.g. part of a gear unit of the drive unit 1.7 located at the carrier structure 1.5.

The table support linkage 1.6 further comprises a second linkage member 1.6.5 located at or toward the table element 1.3. The second linkage member 1.6.5 is e.g. part of a gear unit of the connecting arm 1.6.3 located at the table element 1.3.

In particular, to change from the vertical stowed position P1 to e.g. the horizontal use position P2 the table element 1.3 in the vertical stowed position P1 is pivoted, via the first linkage element 1.6.4 and the second linkage element 1.6.5, partially upward and away from the seat pan 1.2.8.

The pivoting movement of the table element 1.3 may be supported by the drive unit 1.7. Alternatively or additionally, the table element 1.3 may be manually pivoted between the vertical stowed position P1 and the horizontal use position P2.

FIGS. 9 and 10 show perspective views of an embodiment of the tray table device 1.1, wherein FIG. 9 shows the tray table element 1.3 in the horizontal use position P2 and FIG. 10 shows the tray table element 1.3 in a rotated, swung away use position P3 of the tray table element 1.3 for more comfort for larger occupants and also serving as a safety position in emergency situations.

Figure 11:
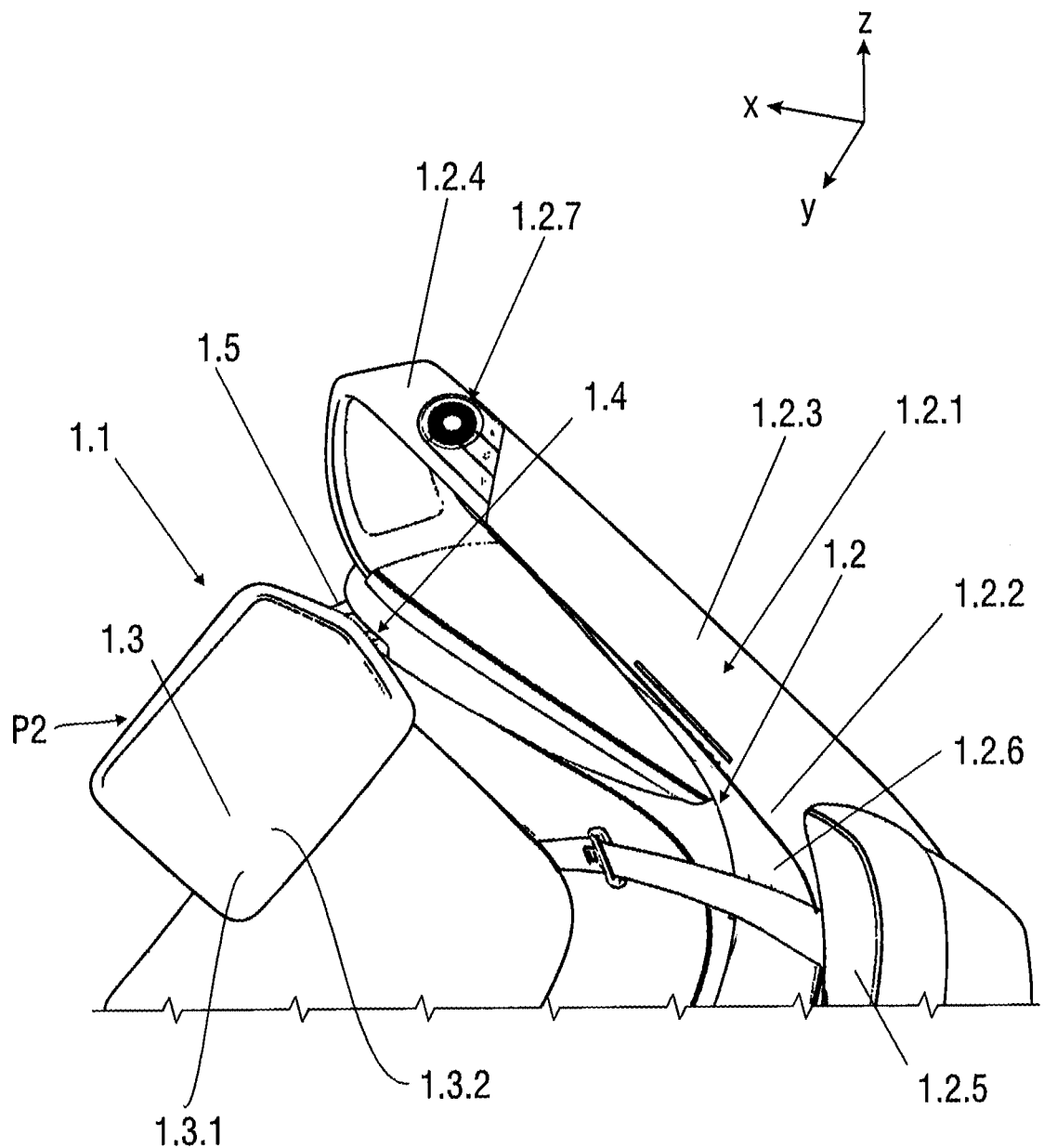
FIG. 11 shows a perspective view of an embodiment of a tray table device for a vehicle seat.

FIG. 11 shows a perspective view of a tray table device 1.1 for a vehicle seat 1.2.

The tray table device 1.1 comprises a tray table element 1.3 and a table support structure 1.4 connected to the tray table element 1.3. A table support structure 1.4 comprises a carrier structure 1.5 and a table support linkage 1.6 (not visible), wherein the carrier structure 1.5 and the table support linkage 1.6 are connected to each other via a single pivot connection PC (not visible). The tray table element 1.3 is continuously movable about the single pivot connection PC between a vertical stowed position P1 and at least one horizontal use position P2.

The vehicle seat 1.2 comprises an occupant support component 1.2.1 with at least a support element 1.2.2 comprising at least an L-shaped upper portion 1.2.3 and a U-shaped side portion 1.2.4. The L-shaped upper portion 1.2.3 is configured to be arranged on an upper surface 1.2.5 of a backrest 1.2.6 and the U-shaped side portion 1.2.4 is configured to be used as an armrest and which comprises a number of controllable devices 1.2.7. The controllable devices 1.2.7 are, for instance, a so-called HMI device for controlling the moving of the tray table element 1.3, for seat control, venting ducts or heating devices and ambient/information LED-lighting devices. The controllable devices 1.2.7 are positioned in an ideal location of an occupant of all sizes to access within reach.

Figure 12:
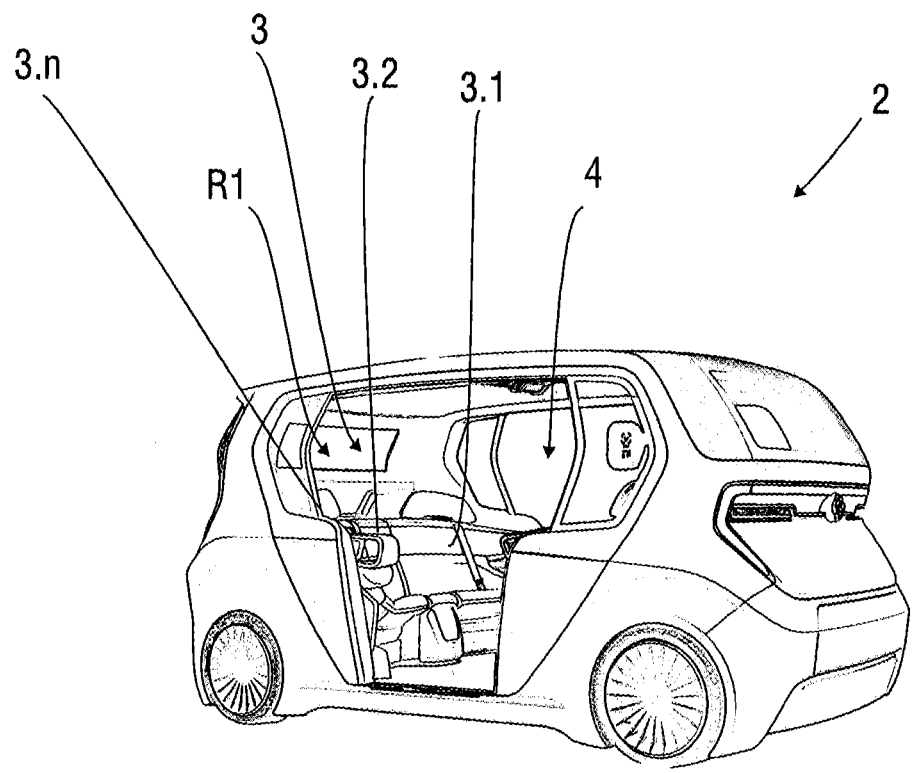
FIG. 12 shows a perspective view of a vehicle comprising a seat arrangement having a plurality of seat assemblies.

FIG. 12 shows a perspective view of an exemplary embodiment of a vehicle 2 comprising a seat arrangement 3 having a plurality of seat assemblies 3.1 to 3.n arranged in a row R1, e.g. a rear row. The vehicle 2 is for example an autonomous driving vehicle configured to autonomously pick up and transport occupants. A vehicle interior 4 can be designed as a passenger compartment in more economy way, comfortable way or luxury way for the occupants or as a loading or storage compartment vehicle.

Figure 13:
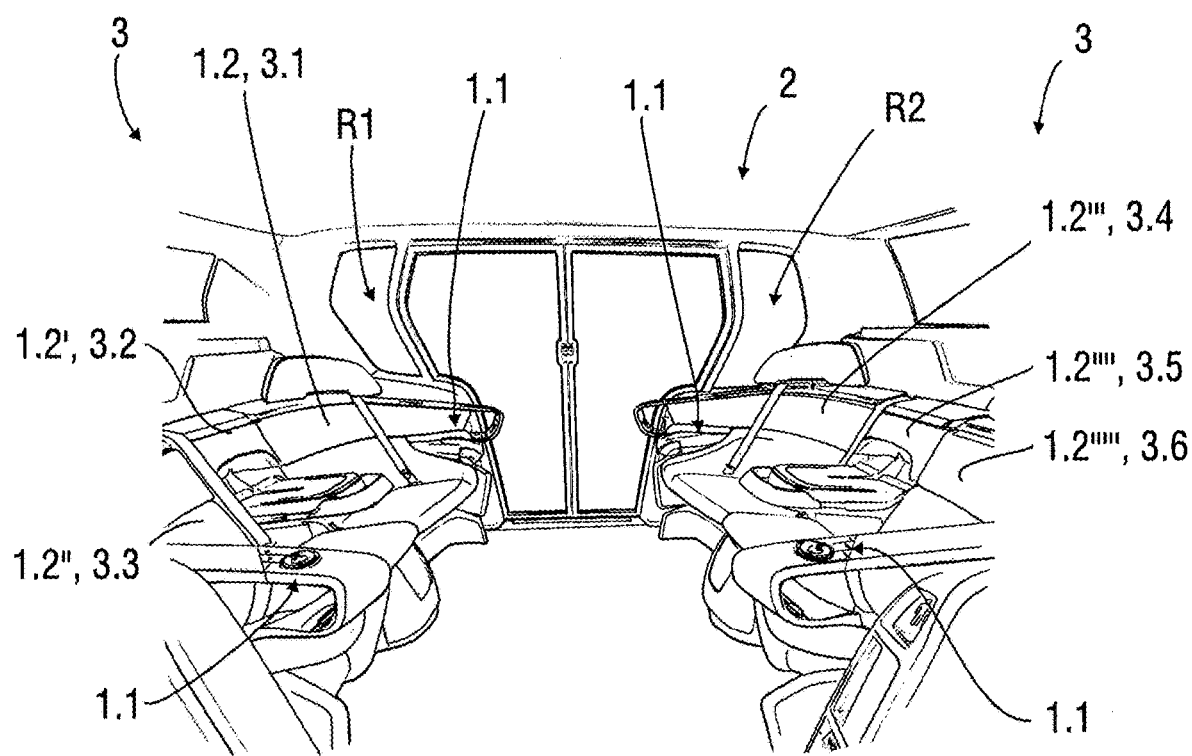
FIG. 13 shows a perspective view of a vehicle interior having at least two rows of a plurality of seat assemblies facing each other.

FIG. 13 shows a perspective view of a vehicle interior 4 having at least two rows R1, R2, e.g. a rear row and a front row, of a plurality of seat assemblies 3.1 to 3.6 of seats 1.2 to 1.2''''. Each of the rows R1 and R2 comprises three seat assemblies 3.1 to 3.3 and 3.4 to 3.6 wherein the seat assemblies 3.1 to 3.3 and 3.4 to 3.6 of the rows R1 and R2 are facing each other.

LIST OF REFERENCES 1.1 tray table device
1.2 to 1.2'''' seat
1.2.1 occupant support component
1.2.2 support element
1.2.3 portion, in particular L-shaped
1.2.4 portion, in particular U-shaped
1.2.5 upper surface
1.2.6 backrest
1.2.6.1 lateral side
1.2.7 controllable device
1.2.8 seat pan
1.2.8.1 lateral side
1.2.8.2 front side
1.2.9 armrest structure
1.3 table element
1.3.1 display
1.3.2 upper usage surface
1.4 table support structure
1.5 carrier structure
1.5.1 mounting area
1.5.2 table connection area
1.6 table support linkage
1.6.1, 1.6.2 end
1.6.3 connecting arm
1.6.4 first linkage member
1.6.5 second linkage member
1.7 drive unit
1.8 clock spring mechanism
2 vehicle
3 seat arrangement
3.1 to 3.n seat assemblies
4 interior
P pivot
PA1 to PA3 pivot axis
PC pivot connection
PM1, PM2 pivot motion
P1 stowed position
P2, P3 use position
R1, R2 row
α angle
x longitudinal axis
y transverse axis
z vertical axis

The invention claimed is:

1. A tray table device for a vehicle seat, comprising at least:
   a table element and a table support structure connected to the table element,
   wherein the table support structure comprises a carrier structure and a table support linkage, said carrier structure being connected to said table support linkage via a single pivot connection,
   wherein the table element is continuously movable about the single pivot connection between a vertical stowed position and at least one horizontal use position,
   wherein the table element is pivotable coupled to the table support linkage,
   wherein the table support linkage comprises at least a clock spring mechanism.

2. The tray table device according to claim 1, wherein the table element is coupled to one end of the table support linkage and the other end of the table support linkage is coupled to the carrier structure.

3. The tray table device according to claim 1, wherein the carrier structure is a stationary part and the table support linkage is a movable part which is rotatable relative to the carrier structure.

4. The tray table device according to claim 1, wherein in the horizontal use position an upper usage surface of the table element substantially faces in a direction towards a ceiling of a vehicle.

5. The tray table device according to claim 4, wherein in the vertical stowed position the upper usage surface substantially faces in a direction away from a lateral seat side of the vehicle seat.

6. The tray table device according to claim 5, wherein the table support linkage is moved about the pivot axis in a substantially arc-shaped or arched manner between the vertical stowed position and the horizontal use position.

7. The tray table device according to claim 1, wherein the table support structure provides a pivot axis positioned tilted relative to a vertical axis at an angle of about 20° to 60°.

8. The tray table device according to claim 1, wherein the table support linkage is moved manually or automatically between the vertical stowed position and the horizontal use position.

9. The tray table device according to claim 1, wherein the table support structure comprises a drive unit for powered adjustment of the table element between the vertical stowed position and the horizontal use position.

10. The tray table device according to claim 1, wherein the table element is pivotable between at least two horizontal use positions.

11. The tray table device according to claim 1, wherein the table element is pivotable about a horizontal axis and configured to be positioned in a tipped position at least towards an occupant.

12. The tray table device of claim 1, wherein said tray table device is part of a vehicle seat comprising at least a seat pan and a backrest.

13. The tray table device according to claim 12, wherein the table support structure is arranged next to the backrest and/or the seat pan, wherein the table element is arranged substantially laterally next to the backrest and/or the seat pan when the table element is positioned in the vertical stowed position.

\* \* \* \* \*